United States Patent [19]

Frease

[11] Patent Number: 5,076,733
[45] Date of Patent: Dec. 31, 1991

[54] MINE ROOF ANCHOR ASSEMBLY HAVING AN EXPANSION SHELL ASSEMBLY WITH A FRICTION REDUCING MEANS

[75] Inventor: Jerry E. Frease, Lexington, Ky.

[73] Assignee: Jennmar Corporation, Pittsburgh, Pa.

[21] Appl. No.: 519,009

[22] Filed: May 4, 1990

[51] Int. Cl.⁵ .............................................. E21D 20/02
[52] U.S. Cl. ................................ 405/259.1; 405/259.6
[58] Field of Search ........................... 405/259, 260, 261

[56] References Cited

U.S. PATENT DOCUMENTS

| Re. 25,869 | 10/1965 | Schuermann et al. | 405/261 |
|---|---|---|---|
| 2,629,908 | 3/1953 | Keck | 24/205 |
| 4,195,952 | 4/1980 | Swanson | 405/259 |
| 4,299,515 | 11/1981 | Yates et al. | 405/259 |
| 4,305,687 | 2/1981 | Parker | 405/260 |
| 4,437,795 | 3/1984 | White | 405/216 X |
| 4,490,074 | 12/1984 | Chaiko | 405/261 X |
| 4,501,516 | 2/1985 | Kotulla et al. | 405/260 |
| 4,618,291 | 10/1986 | Wright | 405/261 |
| 4,784,530 | 11/1988 | Price | 405/261 X |

OTHER PUBLICATIONS

"Bethlehem Roof and Rock Bolts", Bethlehem Steel, Catalog 2366-A.
"Bethlehem Mine Roof Bolts and Accessories", Bethlehem Steel Company (15 total pages).

Primary Examiner—David H. Corbin
Assistant Examiner—John A. Ricci
Attorney, Agent, or Firm—S. J. Price, Jr.

[57] ABSTRACT

A mechanical expansion shell assembly has an expansion shell with a plurality of leaves and a plug with a plurality of sloped surfaces. The inner surfaces of the leaves are positioned in overlying relation with the sloped surfaces of the plug. A friction reducing material is positioned between the overlying surfaces and is arranged to reduce the torque applied to the roof bolt connected to the expansion shell assembly to obtain a preselected lateral force on the expansion shell leaves. In another embodiment, a friction reducing material is positioned between a nut threaded on the roof bolt and the underside of the expansion shell ring portion.

14 Claims, 2 Drawing Sheets

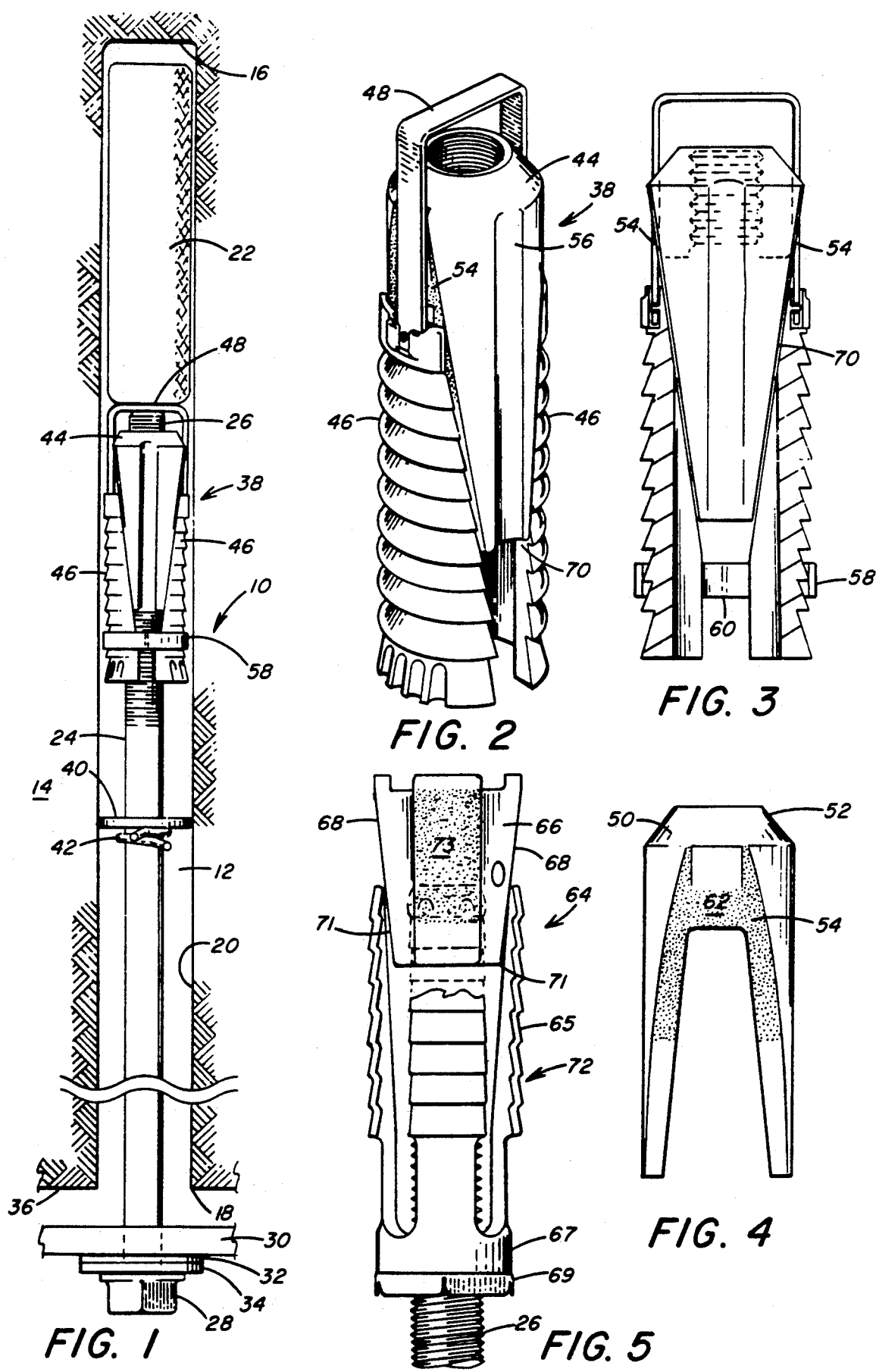

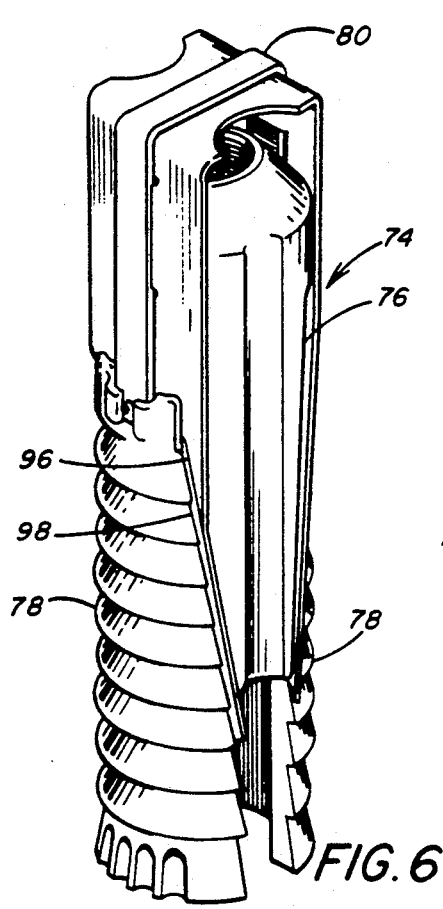
FIG. 6
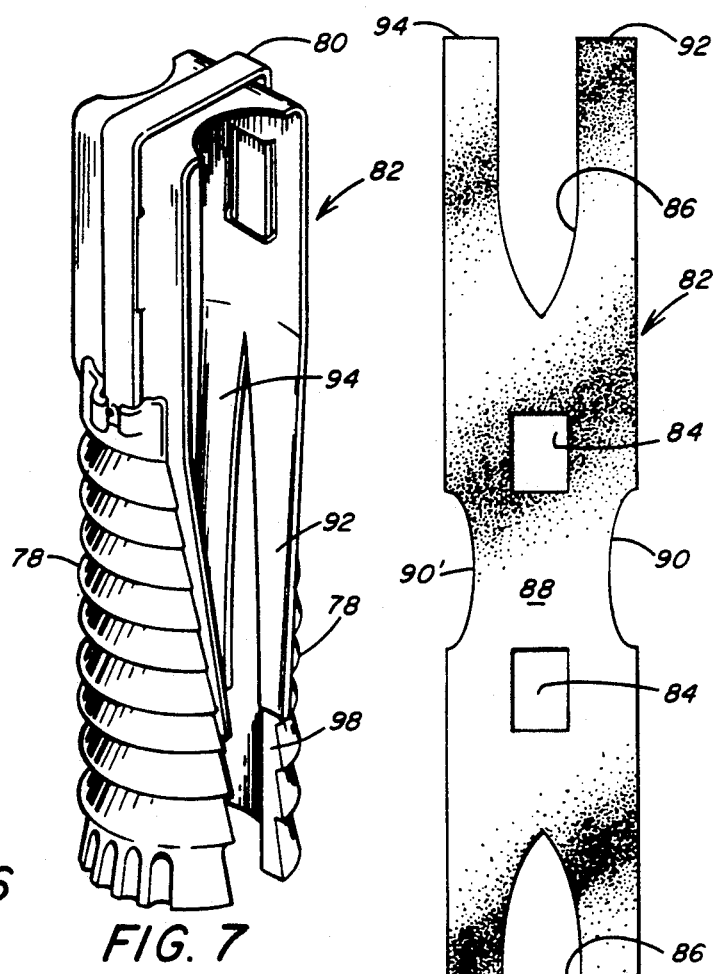
FIG. 7
FIG. 8
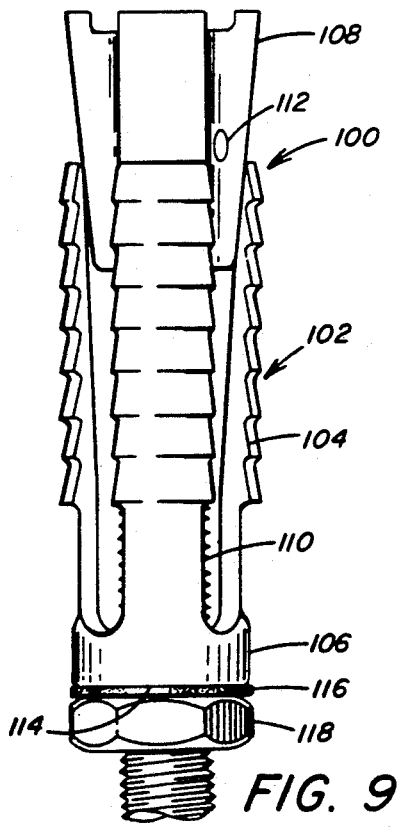
FIG. 9
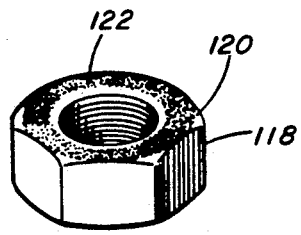
FIG. 10
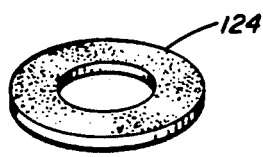
FIG. 11

MINE ROOF ANCHOR ASSEMBLY HAVING AN EXPANSION SHELL ASSEMBLY WITH A FRICTION REDUCING MEANS

BACKGROUND OF THE INVENTION

1. Field of the Invention

This invention relates to an improved mine roof anchor assembly with a friction reducing means and more particularly to a method and apparatus for reducing the torque required to exert a preselected lateral force of the expansion leaves or fingers against a mine roof bore hole wall.

2. Description of the Prior Art

There are several major problems in the known expansion shell assemblies, both the bail type assemblies with a pair of expansion leaves and the mechanical expansion shells having a plurality, usually four, expansion fingers connected to and extending upwardly from a base ring, that cause operating difficulties in anchoring a bolt under tension in a bore hole in a mine roof.

One of the problems is the excessive amount of torque that must be applied to the bolt to expand the leaves or fingers and apply a preselected force on the leaves against the bore hole wall to properly and adequately engage the serrated surfaces of the leaves or fingers to the bore hole wall. The expansion leaves or fingers are urged laterally against the bore hole wall by the sloped surfaces of the plug as the bolt is rotated to move the plug downwardly relative to the expansion leaves or fingers. The plug sloped surfaces and the expansion finger surfaces are in abutting relation and the plug sloped surface moves relative to the inner surface of the leaves or fingers. Both the plug and the expansion leaves or expansion shells are usually formed by sand casting or the leaves may be fabricated from a soft steel. In either case, the surfaces are rough and irregular with a high coefficient of friction between these surfaces. As the leaves or fingers are urged outwardly against the bore hole wall, the friction between the surfaces increase and an excessive torque must be applied to the bolt to move the plug downwardly and provide the required lateral force on the leaves or fingers to anchor the serrated portions of the expansion shell against the bore hole wall to maintain the desired anchorage and tension on the roof bolt anchored in the bore hole.

There is a need for an expansion shell assembly that requires less torque to be applied to the bolt to obtain the desired lateral force on the expansion leaves or fingers to mechanically anchor the bolt assembly in the bore hole.

Another problem of certain mechanical anchors is a "spinner" where upon rotation of the bolt in the bore hole, the expansion leaves or fingers fail to expand or move laterally a sufficient distance to engage the wall of the bore hole and the expansion leaves or expansion fingers continue to rotate with the bolt so that the plug does not move downwardly on the bolt to expand the expansion leaves into engagement with the bore hole wall.

It is believed a major cause of "spinners" is that the friction between the abutting surfaces of the plug and leaves or fingers is greater than the friction between the outer surface of the leaves and the bore hole wall. External factors such as wet bore holes, soft roof strata and fluid like resin in the bore hole reduce the friction between the bore hole wall and the outer surface of the expansion leaves or fingers and contribute to the "spinner" problem. There is a need to reduce the friction between the abutting surfaces of the plug and expansion leaves or fingers below the friction between the external serrated outer surface of the expansion leaves or fingers and the bore hole wall.

U.S. Pat. No. 4,746,248 discloses an anchor bolt anchored by means of resin bonding. Hot-melt adhesive compositions are used as lubricants between the washer and the bolt head and are activated by heat as the bolt is rotated and tensioned in the bore hole. This patent does not disclose the use of mechanical expansion shells.

U.S. Pat. No. 4,619,559 discloses a friction reducing washer between a nut and the roof plate. The nut is threadedly secured to the end of a bolt extending from the bore hole and the friction reducing washer is utilized to increase the tension on the bolt.

U.S. Pat. No. 4,305,687 discloses the use of a roof anchor system consisting of a roof bolt with one or more wedge portions formed on its upper end. The anchor is secured in place by resin bonding material which is forced into contact with the walls of the hole by the wedge-shaped portion of the anchor. It is stated in the patent that compression is best achieved if the wedge-shaped portion of the bolt do not bond well to the grout. Therefore, coatings such as foil coatings, organic coatings or bonded lubricants such as teflon or molybdenum disulfide are placed on the wedge to allow it to move within the resin without being bound to the resin.

SUMMARY OF THE INVENTION

This invention relates to a mechanical expansion shell assembly that includes an expansion shell having a plurality of longitudinally extending leaves with each leaf having an inner surface and an outer surface. A plug having a threaded inner bore and a plurality of sloped outer surfaces is positioned in abutting relation with portions of the expansion shell inner leaf surfaces. The plug is arranged to be threadedly engaged to the threaded end portion of a roof bolt and to move axially upon rotation of the bolt. The leaves of the shell are arranged to expand outwardly to engage the outer surfaces of the leaves to the wall of the bore hole upon axial movement of the plug relative to the expansion shell. Friction reducing means are positioned between the sloped outer surfaces of the plug and the inner surfaces of the leaves so that the friction reducing means reduces the friction generated by the leaf inner surface and the sloped outer surfaces of the plug to thereby increase the lateral force exerted by the leaves of the expansion against the wall of the bore hole at a preselected torque applied to the bolt.

The invention further includes a method of installing an expansion shell assembly where a friction reducing means is positioned between the overlying surfaces of the expansion shell leaves and the plug to reduce the torque required to be applied to the bolt to obtain a preselected lateral force on the expansion fingers against the wall of the bore hole.

The invention also includes positioning a friction reducing means between the underside of the ring portion of an expansion shell and the upper surface of the nut threaded on the threaded end portion of the bolt.

With the above invention it is now possible to reduce substantially the torque required to be applied to a bolt to obtain a preselected lateral force on the expansion shell leaves against the wall of the bore hole. Stated otherwise it is now possible with the herein described invention to reduce substantially the amount of torque that must be applied to a bolt to obtain a preselected lateral force on the expansion shell leaves. If the same torque is applied to the bolt with the herein described expansion shell assembly and to a bolt with a conventional expansion shell assembly the fingers or leaves of the expansion shell assembly of the herein described invention engage the bore hole wall with a substantially greater force than the conventional expansion shell assembly and thus more securely engage the anchor bolt assembly in the mine roof.

The friction reducing means between the overlying surfaces of the expansion shell leaves and the sloped portions of the plug reduce the friction between these surfaces and it is believed contribute substantially to reducing the problem of "spinners".

Accordingly the principal object of this invention is to provide an expansion shell assembly that provides a greater lateral force on the expansion shell leaves for the same torque applied to a bolt having a conventional expansion shell assembly thereon.

Another object of this invention is to provide an expansion shell assembly where the friction between the overlying surfaces of the expansion shell is reduced to thereby reduce "spinners".

These and other objects of the present invention will become apparent as this description proceeds in conjunction with the accompanying drawings and the appended claims.

BRIEF DESCRIPTION OF THE DRAWINGS

FIG. 1 is a view in elevation of a roof bolt assembly positioned in a bore hole with a cartridge of resin prior to fracturing the cartridge and mixing the resin and catalyst in the cartridge and expanding the expansion shell of the expansion shell assembly to place the roof bolt under tension.

FIG. 2 is a perspective view of a bail type expansion shell assembly.

FIG. 3 is a view in vertical section of the expansion shell assembly illustrated in FIG. 2.

FIG. 4 is a view in elevation of the plug illustrating the coating of a friction reducing material on the sloped surface of the plug.

FIG. 5 is a view in elevation of an expansion shell assembly in which the expansion fingers are connected to a lower ring portion and are arranged to expand outwardly by downward movement of a tapered plug upon rotation of the roof bolt in the tapered plug.

FIG. 6 is a perspective view with a portion of the expansion leaves broken away and illustrating a friction reducing strip positioned between the sloped sides of the plug and the inner surface of the expansion shell leaves.

FIG. 7 is a perspective view of the expansion shell assembly without the tapered plug to illustrate the position of the lubricating strip within the expansion shell.

FIG. 8 is a top plan view of the lubricating strip which is arranged to be positioned between the expansion leaves and the tapered plug.

FIG. 9 is a view in elevation of an expansion shell assembly similar to that illustrated in FIG. 5 illustrating a friction reducing member positioned between the lower surface of the expansion shell ring and the jam nut.

FIG. 10 is a perspective view of the jam nut with a coating of friction reducing lubricant on the upper surface.

FIG. 11 is a perspective view of a disc like washer formed from a friction reducing material similar to the friction reducing strip illustrated in FIG. 8, the washer being arranged to be positioned between the expansion shell ring and the jam nut as illustrated in FIG. 9.

DESCRIPTION OF THE PREFERRED EMBODIMENTS

Referring to the drawings and particularly to FIG. 1, there is illustrated a roof bolt assembly generally designated by the numeral 10 that is arranged to be positioned within a bore hole 12 in a mine roof 14. The bore hole 12 has a blind end portion 16 and an open end portion 18 through which the bolt assembly 10 is inserted into the bore hole 12. The bore hole 12 has a wall 20 against which the expansion leaves of the bolt assembly 10 are engaged to secure and tension the bolt assembly 10 in the bolt hole 12. A cartridge of resin 22 is positioned in the bolt hole 12 and is arranged to abut the blind end 16. The resin cartridge contains a suitable resin in one compartment and a catalyst or hardener in a second compartment. The compartments preferrably are elongated and extend longitudinally in the cartridge and the compartments are separated from each other by a membrane. As later described, the roof bolt assembly 10 is arranged upon insertion to fracture the cartridge 22 and rotation of the expansion shell assembly and roof bolt prior to engagement of the expansion shell assembly with the bore hole wall 20 to fracture the cartridge and mix the resin and catalyst so that the catalyst will harden and secure the bolt assembly 10 within the bore hole 12.

The roof bolt assembly 10 includes a roof bolt 24 which has a threaded end portion 26 at one end and a bolt head 28 at the other end. As illustrated in FIG. 1, the bolt has a smooth external surface. It should be understood that the bolt may also be fabricated from a rebar with an irregular outer surface.

The roof bolt assembly 10 has a roof plate 30 positioned thereon in abutting relation with a pair of washers 32 and 34. The washer 32 is preferably formed from a friction reducing material and the washer 34 is a hardened metallic washer. The washer 34 abuts the bolt head 28 and the washer 32 has a surface in abutting relation with the metallic washer 34 and the other surface in abutting relation with the roof plate 30. The bolt assembly 10 is arranged to move the roof plate into abutting relation with the mine roof 36 and by rotation of the bolt 24 to exert a tension on the bolt 24 as the roof plate 30 is urged upwardly against the mine roof 36.

The roof bolt assembly 10 includes an expansion shell assembly 38 that is threadedly secured to the bolt threaded end portion 26 and is arranged to engage the wall 20 of bolt or bore hole 12. The roof bolt assembly further includes an annular resin retaining metallic washer 40 which as a diameter slightly smaller than the diameter of the bore hole 12. A spring clamp 42 is engaged to the roof bolt 24 and is arranged to adjustably position the rigid resin retaining washer 40 thereon at a preselected location along the length of the bolt 24.

The expansion shell assembly 38 is illustrated in detail in FIGS. 2, 3 and 4 and includes a plug 44, a pair of expansion leaves or fingers 46 which are connected to each other by a bail 48 which extends over the top of the plug 44.

The plug 44 is illustrated in detail in FIG. 4 and includes a body portion 50 with a frusto-conical top portion 52 and a pair of sloped side portions 54. As illustrated in FIGS. 1 and 2, the plug has a pair of vertical slots or recessed portions 56 which permits the resin from cartridge 22 to flow downwardly in the bore hole 12 around the plug 44 and the expansion shell assembly 38. The resin retaining washer 40 maintains the resin above the washer 40 and the bore hole blind end 16.

The expansion leaves 46 are urged toward each other by a ring 58 which extends around the pair of expansion leaves 46. The ring is preferrably formed of a flexible material that will tear along the tear line 60 when the bolt is rotated in the bore hole 12. The ring 58 may be removed as the expansion shell assembly is inserted in the bore hole to permit the lower ends of the expansion leaves 46 to abut the wall 20 of the bore hole as the roof bolt assembly is inserted into and moved upwardly in the bore hole 12.

As illustrated in FIGS. 2 and 4, the tapered surfaces 54 of the plug 44 are coated with a friction reducing material 62 such as Plasti-Dip manufactured by PDI Inc., 3760 Flowerfield Road, Blaine, Minn. or a material such as hot-melt glue. It is preferred that the friction reducing material have a high compression strength so that it remains between the abutting surfaces as the force urging the abutting surfaces together increases. The purpose of the friction reducing coating 62 on the surfaces 54 of plug 44 is to increase the force urging the expansion leaves 46 against the wall 20 of bore hole 12. It should be understood that the inner surfaces 70 of the expansion leaves 46 which are in frictional engagement with the sloping walls 54 of the plug 44 may be coated with a friction reducing material 62. Where desired, both the surfaces 54 of plug 44 and the surfaces 70 of the expansion fingers 46 may be coated with the friction reducing material 62.

The bolt assembly 10 is inserted into the bore hole 12 after the cartridge of resin 22 and the bolt is moved upwardly in the bore hole so that the bail 48, the bolt end 26 and the plug 44 fracture the resin cartridge 22 to permit both the resin and catalyst to flow downwardly within the bore hole 12.

After the bolt assembly is moved into a position where the roof plate 30 is closely adjacent the mine roof 36, the bolt 24 is rotated to mix the resin in the bore hole. The rotation of the plug 44 and the expansion shell leaves 46 as a unit with the bail 48 mix the resin and catalyst within the bore hole 12. The resin flows downwardly around the expansion shell assembly and below the expansion assembly against the resin retaining washer 40. The resin retaining washer 40 is so positioned on the bolt 24 that the resin within the bore hole between the bore hole blind end and the resin retaining washer 40 is compressed and urged into any cracks and crevices in the bore hole wall 20.

Further rotation of the bolt 24 moves the plug 44 downwardly on the bolt threaded portion 26 and upon fracture of the bail 48, urges the expansion leaves 38 outwardly against the bore hole wall 20. The friction reducing material 62 coating the sloped portions 54 of the plug reduce the energy or torque on the bolt 24 required to urge the expansion leaves 46 into engagement with the bore hole wall 20. Further rotation of the bolt 24 exerts a tension on bolt 24 between the plug 44 and the roof plate 30. The friction reducing washer 32 at the base of the bolt 24 reduces the friction between the roof plate 30 and the metallic washer 34 to further reduce the torque required to provide the desired tension on the roof bolt 24.

Thus, with this arrangement, the roof bolt assembly includes a resin retaining washer 40 that compresses the resin within the bolt hole so that the resin is maintained under compression while the resin is being mixed and also maintains the resin under compression until the resin rigidifies. The roof bolt assembly 10 further includes the friction reducing coating 62 on the sloped surfaces 54 of the plug 44 to reduce the energy or torque required to exert a desired force on the expansion shell leaves 46 against the bore hole wall 20. Thus, the roof bolt assembly includes a means to reduce the torque required to engage the expansion shell leaves without reducing the strength of the roof bolt assembly components. The friction reducing coating 62 between the expansion leaves 46 and the sloped surfaces 54 of the plug to a valve where the friction between the outer surface of the leaves 46 and the bore hole wall 20 is sufficient to engage the expansion leaves 46 to the bore hole wall 20 without causing a "spinner".

Referring to FIG. 5, there is illustrated another embodiment of a mechanical expansion shell assembly generally designated by the numeral 64 that includes a plug 66 with sloped surfaces 68 and an expansion shell 72. The expansion shell 72 has a plurality of expansion fingers 65 that are connected at their base to a ring portion 67. A PAL nut or jam nut 69 is threaded on the bolt threaded portion 26 and the expansion shell ring portion 69 abuts the upper surface of the PAL nut 69. The expansion shell expansion fingers 65 have inner surfaces 71 that abut the sloped surfaces 68 of the plug 66. The sloped surfaces 68 have a coating 73 of friction reducing material thereon to reduce the friction between the plug sloped surface 68 and the inner surfaces 71 of the expansion fingers 65. It should be understood that the coating 73 could also be applied to the inner surfaces 71 of the expansion fingers 65. With this arrangement, the coating of friction reducing material reduces the amount of torque required to be applied to the bolt to exert a predetermined lateral force on the expansion fingers 65 against the bore hole wall.

Referring to FIGS. 6-11, another embodiment of the friction reducing means is illustrated. FIG. 6 illustrates an assembled bail-type shell assembly generally designated by the numeral 74, which includes a tapered plug 76 and a pair of expansion leaves 78 connected to each other by means of a bail 80 extending over the upper portion of plug 76.

FIG. 7 illustrates the expansion fingers or leaves 78 connected to the bail 80 with the tapered plug omitted to better illustrate the friction reducing strip generally designated by the numeral 82.

The friction reducing strip 82 is illustrated in plan in FIG. 8 and has a generally flat configuration and is preferrably formed from a friction reducing material such as polyethylene and has a thickness or preferrably 1/32 of an inch. The friction reducing strip may be fabricated from other materials that have similar friction reducing properties. The friction reducing strip 82 has a pair of rectangular openings 84 and a pair of slots 86 formed in the ends of the strip body portion 88. There are also a pair of cutaway portions 90 along the sides of the strip 82. The openings 84 permit the bail 80 to abut the side wall of the tapered plug 76 adjacent the upper portion and the slots 86 provide legs 92 and 94 to abut the inner surface 96 of the expansion fingers 78. The position of the strip of friction reducing material is illustrated in FIG. 7 with the legs 92 and 94 in overlying relation with the edges 98 of the expansion leaves or fingers 78.

With the above arrangement, the end of the bolt is threadedly engaged in the tapered plug 76 and rotation of the bolt relative to the tapered plug 76 and the expansion fingers or leaves 78 moves the plug 76 downwardly relative to the expansion fingers 78 and moves the expansion fingers or leaves 78 into engagement with the bolt hole wall. With the friction reducing strip positioned as illustrated in FIGS. 6 and 7, the tapered plug surface 96 abuts the friction reducing strip legs 92 and 94 and is in sliding relation therewith. The other surface of the legs 92 and 94 are in abutting relation with the surfaces 98 of the expansion leaves or fingers 78 so that the friction reducing strip 82 is positioned between the surfaces of the tapered plug 76 and the expansion fingers 78. The friction reducing strip 82 reduces the friction between the expansion fingers or leaves 78 and the plug 76 as the plug 76 moves and expands the expansion fingers or leaves 78 into engagement with the bolt hole wall and thus, as previously described, reduces the torque requirements for the expansion shell assembly 74 to expand and engage the bolt hole wall.

FIGS. 9, 10 and 11 illustrate another embodiment of a friction reducing means utilized with an expansion shell assembly generally designated by the numeral 100. The expansion shell assembly 100 has an expansion shell 102 with a plurality, preferrably four, of expansion fingers 104 which are connected to each other by a ring member 106 located at the base of the fingers 104. The fingers 104 extend upwardly from the ring member 106 and are arranged to expand into engagement with the bolt hole wall. A tapered plug 108 is threadedly secured to the bolt end portion 110 and may include a bore 112 or a shear pin as described in U.S. Pat. Nos. 4,419,805 and 4,413,930. The lower surface of the ring portion 106 of the expansion shell 102 has an undersurface 114 which abuts a friction reducing means 116 and a PAL nut or jam nut 118 is threadedly secured to the bolt threaded end portion 110 with the friction reducing means 116 between the lower surface of the expansion shell ring 106 and the upper surface of the jam nut 118.

FIG. 10 illustrates a jam nut 118 with its upper surface 120 coated with a friction reducing material 122 similar to the friction reducing coating previously described. Another embodiment of the friction reducing means is a circular disk or washer 124 formed from polyethylene material or other materials similar to that for the friction reducing strip 82. The washer 124 may be utilized as the friction reducing means 116 illustrated in FIG. 9 or the jam nut 118 may have a friction reducing coating 122 applied to the upper surface of the nut.

It has been found that there is a substantial reduction in torque obtained by utilizing the friction reducing means 116 between the expansion shell ring 106 and the jam nut 118. It should be understood that the friction reducing means previously described may also be applied between the inner surface of the expansion fingers 104 and the sloped portions of the plug 108 as previously described.

It has been found that, by placing a lubricant or friction reducing material with high compressive properties between the leaves of the mechanical expansion shell and the tapered plug, the amount of horizontal force exerted by the leaves of the expansion shell assembly is increased substantially.

The following tabulation of the force exerted on the leaves of the expansion shell at various pull loads on the bolt illustrate the increase in the lateral force on the leaves when a friction reducing or lubricating means is placed between the inner surface of the leaves and the outer surface of the plug. The tabulation is a direct correlation between the torque applied on the bolt to the lateral force exerted by the leaves on the wall of the bore hole. For each foot pound of torque that is applied to the bolt, there is 60 pounds of pull on the bolt. The tabulation is expressed in pounds pull on the bolt which can be readily converted to torque on the bolt.

TABLE

| Shell #1-Dry | | Shell #2 w/Lubricant | |
|---|---|---|---|
| Pull (Load lbs.) | Leaf Force | Pull (Load lbs.) | Leaf Force |
| 47 | 90 | 47 | 40 |
|  |  | 94 | 100 |
|  |  | 117 | 140 |
| 141 | 120 | 141 | 190 |
|  |  | 164 | 230 |
| 185 | 180 | 185 | 280 |
| 211 | 200 | 211 | 320 |
| 235 | 220 | 235 | 370 |
| 258 | 250 | 258 | 420 |
| 282 | 270 | 282 | 470 |
| 305 | 300 | 305 | 530 |
| 329 | 330 | 329 | 590 |
| 376 | 380 | 376 | 660 |
| 423 | 420 | 423 | 730 |
| 470 | 460 | 470 | 890 |
| 517 | 520 | 517 | 1020 |
| 564 | 570 | 564 | 1130 |
| 611 | 630 | 611 | 1230 |
| 658 | 670 | 658 | 1320 |
| 705 | 750 | 705 | 1430 |
| 752 | 800 | 752 | 1510 |
| 799 | 850 | 799 | 1640 |
| 1034 | 1040 | 1034 | 2080 |
| 1269 | 1270 | 1269 | 2630 |
| 1504 | 1490 | 1504 | 3170 |
| 1739 | 1710 | 1739 | 3860 |
| 1974 | 1910 | 1974 | 4340 |
| 2209 | 2160 | 2209 | 4860 |
| 2914 | 2890 | 2914 | 6060 |
| 3149 | 3270 | 3149 | 6360 |
| 3384 | 3510 | 3384 | 6690 |
| 3619 | 3810 | 3619 | 7360 |
| 3854 | 4080 | 3854 | 7640 |
| 4089 | 4500 | 4089 | 7960 |
| 4324 | 4780 | 4324 | 8240 |
| 4559 | 5000 | 4559 | 8500 |
| 5029 | 5850 | 5029 | 8960 |
| 5499 | 6840 | 5499 | 9220 |
| 5969 | 7720 | 5969 | 9830 |
| 6439 | 9420 |  |  |

The tabulation illustrates at a pulling force of 1269 lbs. or a torque of 21.15 ft. lbs. without the friction reducing means between the surfaces, the lateral force on the leaf is 1270 lbs. whereas at the same pulling force or torque of the bolt that has the friction reducing means, the lateral force is increased to 2630 lbs. At a pulling force of 611 lbs. without lubricant, the lateral force is 630 lbs. and with lubricant is increased to 1230 lbs.

According to the provisions of the Patent Statutes, I have explained the principal, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. A mechanical expansion shell assembly comprising:

an expansion shell having a plurality of longitudinally extending leaves, each leaf having an inner surface and an outer surface;

a plug having a threaded inner bore and having a plurality of sloped outer surfaces, said sloped outer surfaces in overlying relation with leaf inner surfaces, said plug adapted to threadedly engage the threaded end portion of a roof bolt and to move axially on said bolt upon rotation of said bolt;

said leaves of said expandable shell arranged to expand outwardly to engage said outer surfaces of said leaves to the wall of a bore hole upon the axial movement of said plug relative tot said expandable shell;

a plastic-like friction reducing means positioned between said surfaces of said plug and said leaves for reducing the friction generated between said leaf inner surfaces and said sloped outer surfaces of said plug and thereby increase the lateral force exerted by said leaves on said bore hole wall at a preselected torque applied to said bolt; and said friction reducing means having sufficient rigidity so that at least a portion of said friction reducing means remains between said surfaces of said plug and said leaf inner surfaces during the expansion of said expansion shell into engagement with the wall of said bore hole.

2. A mechanical expansion shell assembly as set forth in claim 1 wherein said friction reducing means includes a lubricant coating between the overlying surfaces of said plug and said expansion leaves.

3. A mechanical expansion shell assembly as set forth in claim 1 wherein said friction reducing means includes a strip of plastic generally rigid material having lubricating properties and compressive properties to maintain at least a portion of said friction reducing means between the surfaces of the plug and leaves during expansion of the leaves.

4. A mechanical expansion shell assembly as set forth in claim 3 in which said strip of material is polyethylene.

5. A mechanical expansion shell assembly as set forth in claim 1 wherein said friction reducing means includes a layer of plastic coating having lubricating properties over at least a portion of said sloped surfaces of said plug.

6. A mechanical expansion shell assembly as set forth in claim 1 wherein said friction reducing means includes a layer of generally rigid plastic coating having lubricating properties covering at least a portion of said inner surfaces of said leaves.

7. A mechanical expansion shell assembly comprising:

an expansion shell having a pair of separate longitudinally extending leaves, each leaf having an upper end and an inner and outer surface;

a bail having two ends, each ends, each end secured to said upper end of a leaf;

a plug having a pair of inclined opposing surfaces, said inclined surfaces overlying a portion of said leaf inner surfaces of said expansion shell, said plug having a threaded inner bore arranged to threadedly engage the threaded end portion of a roof bolt, said plug arranged to move axially on said roof bolt upon rotation of said bolt, said expansion shell leaves adapted to expand outwardly to engage said outer surfaces of said leaves with the wall of a bore hole upon the axial movement of said plug on said bolt;

plastic-like friction reducing means positioned between said expansion shell inner leaf surfaces and said plug inclined surfaces and arranged for reducing the friction between said expansion shell inner leaf surfaces and said plug inclined surfaces;

said friction reducing means having sufficient rigidity so that at least a portion of said friction reducing means remains between said surfaces of said plug and said leaf inner surfaces during the expansion of said expansion shell into engagement with the wall of said bore hole.

8. A mechanical expansion shell assembly as set forth in claim 7 in which said friction reducing means is arranged so that the friction between said expansion shell inner leaf surface and said plug inclined surface is less than the friction between said expansion shell outer leaf surfaces and said bore hole wall.

9. A mechanical shell assembly as set forth in claim 7 wherein said friction reducing means includes a generally rigid plastic having lubricating properties under high compressive forces.

10. A mechanical expansion shell assembly as set forth in claim 7 wherein said friction reducing mean is a sheet of material having lubricating properties at high compressive forces.

11. A mechanical expansion shell assembly as set forth in claim 7 wherein said friction reducing mean is a plastic coating covering at least a portion of said inclined surfaces of said plug.

12. A mechanical expansion shell assembly as set forth in claim 7 wherein said friction reducing means includes a plastic coating covering at least a portion of said expansion inner leaf surfaces.

13. A method of installing an expansion shell assembly in a bore hole comprising:

positioning an expansion shell assembly on the threaded end portion of a bolt, said expansion shell assembly having a plug threaded on said bolt and a plurality of sloped surfaces, an expansion shell having a plurality of leaves with an inner surface in overlying relation with said sloped surfaces of said plug, positioning a generally rigid, plastic-like friction reducing means between said overlying surfaces of said leaves and said plug, and rotating said bolt in said bore hole to move said plug downwardly relative to said expansion shell and move said expansion shell fingers into abutting relation with the wall of said bore hole, said friction reducing means reducing the torque on said bolt required to apply a preselected lateral force on said expansion shell fingers against the wall of the bore hole, said friction reducing means having sufficient rigidity so that at least a portion of said friction reducing means remains between said sloped surfaces of said plug and said inner surface of said leaves.

14. A mechanical expansion shell assembly comprising:

an expansion shell having a ring portion with a plurality of fingers extending longitudinally therefrom, each finger having an inner surface and an outer surface, a plug having a threaded bore and a plurality of sloped outer surfaces, said sloped outer surfaces being positioned in overlying relation with a portion of said finger inner surfaces, said plug adapted to threadedly engage the threaded end portion of a roof bolt and to move axially on said bolt upon rotation of sad bolt, a nut adapted to be threaded on said threaded end portion of said roof bolt with sad expansion shell ring portion lower surface in overlying relation with said nut upper surface, generally rigid, plastic-like friction reducing means having lubricating properties and compressive properties positioned between said ring lower surface and said nut upper surface for reducing the torque required on said bolt to obtain a preselected lateral force on said fingers, while maintaining at least a portion of said friction reducing means between said sloped surfaces of said plug and said inner surfaces of said fingers.

* * * * *